A. NELSON.
PROPELLER SLED.
APPLICATION FILED APR. 18, 1913.
1,087,047.
Patented Feb. 10, 1914.
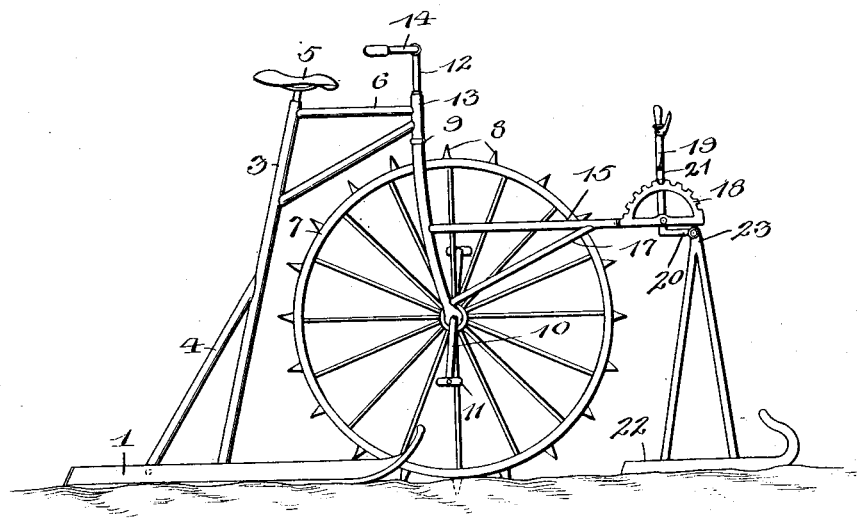
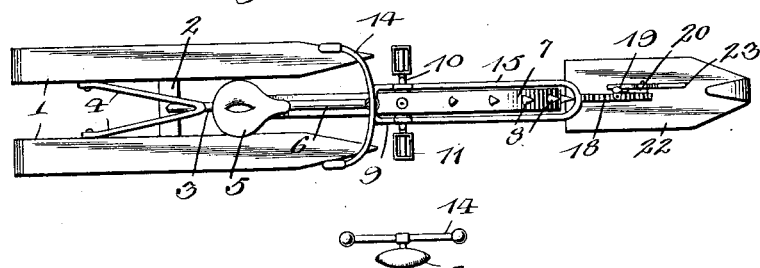
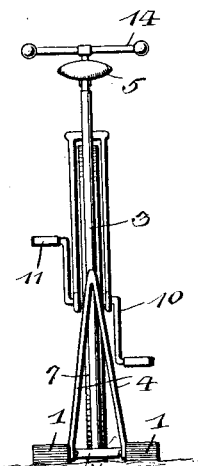
Witnesses
Inventor
A. Nelson,
By Victor J. Evans
Attorney

UNITED STATES PATENT OFFICE.

ADOLF NELSON, OF McINTOSH, MINNESOTA.

PROPELLER-SLED.

1,087,047.  Specification of Letters Patent.  Patented Feb. 10, 1914.

Application filed April 18, 1913. Serial No. 762,078.

*To all whom it may concern:*

Be it known that I, ADOLF NELSON, a citizen of the United States, residing at McIntosh, in the county of Polk and State of Minnesota, have invented new and useful Improvements in Propeller - Sleds, of which the following is a specification.

This invention is an improved propeller sled adapted to be driven manually and consists in the construction, combination and arrangements of devices hereinafter described and claimed.

The object of the invention is to provide an improved propeller sled which may be operated like a bicycle by a person mounted on a seat and by pedaling a traction wheel and operating steering bars as in the case of a bicycle and which sled is extremely light and simple in construction, is strong and durable, may be readily driven and is capable of developing great speed.

In the accompanying drawing:—Figure 1 is a side elevation of a propeller sled constructed in accordance with my invention. Fig. 2 is a rear elevation of the same. Fig. 3 is a plan of the same.

In accordance with my invention, I provide a pair of runners 1 which in practice are preferably skees. These runners or skees are arranged a suitable distance apart, usually about five inches, and are connected by a cross bar 2 which is here shown as arranged about midway between the front and rear ends of the runners or skees.

A standard 3 rises from the center of the cross bar 2 and has its lower end secured thereto. Suitable braces 4 are provided for the standard, the said braces being secured at their lower rear ends to the runners or skees and at the upper end of the standard is a seat 5 and also a forwardly and upwardly extending frame 6. A traction wheel 7, which in practice may be constructed like a bicycle wheel and is provided with peripheral spurs 8, has its axle mounted in bearings in the lower ends of the arms of a fork 9 and provided with cranks 10 and pedals 11.

The fork has at its upper end a steering head 12 which is pivotally mounted in a bearing 13 at the front end of the frame 6 and at the upper end of the steering head is a steering bar 14 which is similar to that of a bicycle. The lower side of the wheel is arranged between and in front of the skees or runners and it will be understood that the wheel may be turned in any desired direction in order to guide or steer the sled.

A pair of forwardly converging supporting arms 15, which may be provided with suitable braces 17, extend from and are secured to the arms of the fork and project for a suitable distance in front of the wheel. A segment 18 is secured at the front ends of the said supporting arms. A lever 19, which has at its lower end a forwardly extending crank arm 20, is pivotally arranged at one side of the segment and is provided with a spring-pressed locking dog 21 to engage the segment and lock the lever thereto at any desired position.

A pilot runner 22, which is relatively broad and flat and the front end of which is upturned, is arranged directly in front of the wheel and is provided with standards 23 which are pivotally connected to the crank portion of the lever 19. Hence, by turning the said lever the pilot runner may be raised or lowered at will and by engaging the locking dog with the segment the pilot runner may be secured at any desired elevation.

The pilot runner will be adjusted according to the depth and condition of the snow, serves to compress the snow directly ahead of the wheel so as to facilitate the traction of the latter, and, hence, it will be understood that when the wheel is revolved by pedaling, by the person on the sled, the sled will be propelled readily, and rapidly over the surface of snow or ice.

I claim:—

1. A sled of the class described having a traction wheel arranged in front thereof, means to revolve the traction wheel, a pivotal support for the traction wheel to turn the latter in any required direction to guide the sled, a pilot runner arranged in front of the traction wheel and means to raise and lower the pilot runner, the pilot runner and the raising and lowering means being also carried by the pivoted support for the traction wheel and caused to turn with the traction wheel in any direction required to steer the sled.

2. The herein described propeller sled comprising a pair of main runners or skees, spaced apart and arranged side by side, a standard extending upwardly from the runners or skees, a seat on the standard, a frame projecting forwardly from the standard, a steering fork mounted in the said frame, a traction wheel mounted in said steering fork, arranged in the space between and at the front of the runners or skees, means to revolve the traction wheel, a support projecting forwardly from the steering fork, a pilot runner carried by said support, and means to raise and lower the pilot runner.

In testimony whereof I affix my signature in presence of two witnesses.

ADOLF NELSON.

Witnesses:
C. M. BERG,
K. K. HOFFARD.

Copies of this patent may be obtained for five cents each, by addressing the "Commissioner of Patents, Washington, D. C."